United States Patent [19]

Houvener

[11] Patent Number: 5,657,389
[45] Date of Patent: Aug. 12, 1997

[54] POSITIVE IDENTIFICATION SYSTEM AND METHOD

[75] Inventor: Robert C. Houvener, Nashua, N.H.

[73] Assignee: Image Data, LLC, Bedford, N.H.

[21] Appl. No.: 436,146

[22] Filed: May 8, 1995

[51] Int. Cl.$^6$ .................. H04L 9/32; G06K 9/62
[52] U.S. Cl. .................. 380/23; 340/825.34; 382/115
[58] Field of Search .............. 380/23; 340/825.34; 382/115

[56] References Cited

U.S. PATENT DOCUMENTS

| | | | |
|---|---|---|---|
| 3,569,619 | 3/1971 | Simjian | 235/380 |
| 3,711,833 | 1/1973 | Starkey | 340/825.34 |
| 4,156,911 | 5/1979 | Crane et al. | 340/825.34 X |
| 4,858,121 | 8/1989 | Barber et al. | 364/406 |
| 4,991,205 | 2/1991 | Lemelson | 380/5 |
| 4,993,068 | 2/1991 | Piosenka et al. | 380/23 |
| 4,995,081 | 2/1991 | Leighton et al. | 380/23 |
| 5,053,608 | 10/1991 | Senanayake | 235/380 |
| 5,095,196 | 3/1992 | Miyata | 235/382 |
| 5,131,038 | 7/1992 | Puhl et al. | 380/23 |
| 5,224,173 | 6/1993 | Kuhns et al. | 340/825.34 X |
| 5,259,025 | 11/1993 | Monroe et al. | 380/23 |
| 5,321,751 | 6/1994 | Ray | 380/23 |
| 5,337,358 | 8/1994 | Axelrod et al. | 380/23 |
| 5,416,306 | 5/1995 | Imahata | 235/380 |
| 5,436,970 | 7/1995 | Ray et al. | 380/23 |
| 5,466,918 | 11/1995 | Ray et al. | 235/380 |

*Primary Examiner*—Gilberto Barrón, Jr.
*Attorney, Agent, or Firm*—Devine, Millimet & Branch, P.A.

[57] ABSTRACT

The present invention is a system and method of positively identifying individuals. The system comprises a point of identity verification terminal having a means for inputting data presented by a particular individual, at least one database storage and retrieval site having stored therein a plurality of digital image data unique to persons to be identified, and a means for exchanging data between the point of verification terminal and the database site. The database site comprises a means for validating that a point of verification terminal seeking to exchange data with the site is authorized to do so. At the database site, the system receives the information presented at the point of verification terminal and searches the database to find the unique image data corresponding to the unique data. The system then transmits the image data to the point of verification terminal where it is displayed on a display means. Finally, the system incorporates a means for verifying that an identifier present at the point of verification has adequately verified that the digital image displayed on the display means matches physical information provided by the person to be identified at the point of verification terminal.

17 Claims, 3 Drawing Sheets

POSITIVE IDENTIFICATION SYSTEM AND METHOD

FIELD OF THE INVENTION

The present invention relates to the field of identity verification. Specifically, the invention is directed to a device and method for obtaining and displaying a digital image of a person associated with a particular event. More particularly, the device and method can be used to verify that the user of a credit card is, in fact, the owner of the card. While the device and method will be described herein in relation to such a credit card based identification scenario, it should be understood that the invention is applicable to any situation where positive identification is required including, banking transactions, welfare distributions, voting, firearms sales and other law enforcement situations, health care, airline tickets including frequent flier redemption, and immigration and naturalization purposes.

BACKGROUND OF THE INVENTION

Positive identity verification is critical in many types of transactions and security procedures. For example, signatures, fingerprints or images of faces are compared to establish identity. Creation of fraudulent identities or the misrepresentation of an individual's identity can result in fraudulent transactions and the breach of security systems. At present, such positive identification means as drivers' licenses, picture identification cards, hand-written signatures, personal identification numbers, fingerprints, retinal scans, voice prints and other ways of uniquely identifying personal characteristics are used. However, these prior art methods of identity verification exhibit one or more of the following characteristics: 1) they do not offer sufficient reliability for most positive personal identification applications; 2) the technology required for their implementation is too expensive for wholesale adoption by entire industries; 3) they do not offer ease of use, which is critical for most applications of personal identification; 4) the technology required to implement them in a wide-scale manner is not yet mature enough to guarantee sufficient reliability; 5) the recurring cost of using the technology is too high for most applications of personal identification; 6) the data used for identity verification is not maintained in a secure manner and is almost universally held by the person presenting it as the form of verification, thereby allowing for fraudulent alteration of the verification data; 7) processes for building accurate verification databases for wide-spread use are impractical; and 8) the process of verification does not include sufficient steps to ensure that the individual responsible for identity verification is accountable to ensure that identity verification is accurately performed.

One system which relies on positive identity verification for transactions is the credit/debit and charge card system. Credit cards are an increasingly popular means for consumers to complete transactions. However, part of the costs incurred from the convenience of using credit cards is the burgeoning growth of credit card fraud. Because there are trillions of dollars of credit card transactions made each year, which depend on the fact that the person presenting the form of payment is actually the person having the legal right to use the underlying account, even a small percentage of fraudulent transactions results in billions of lost dollars. The cost of this fraud is paid for, indirectly, by the consumers in the form of higher credit card interest rates and fees and, in part, by the merchants accepting such credit cards in the form of higher transaction commissions.

Methods used to combat fraud have been the use of holographic images on cards, the need for a validation requester to obtain transaction approval, the encoding of cardholder information on magnetic strips on the back of the card, as well as signature verification. A number of patents have issued on identification devices and methods. Of particular note is U.S. Pat. No. 5,321,751, issued to Ray, et al. on Jun. 14, 1994. Other prior art references of note are U.S. Pat. No. 5,337,358, issued to Axelrod, et al. on Aug. 9, 1994, U.S. Pat. No. 5,095,196, issued to Miyata on Mar. 10, 1992, U.S. Pat. No. 5,259,025, issued to Monroe, et al. on Nov. 2, 1993, U.S. Pat. No. 4,995,081, issued to Leighton, et al. on Feb. 19, 1991, U.S. Pat. No. 4,991,205, issued Lemelson on Feb. 5, 1991, U.S. Pat. No. 5,053,608, issued to Senanayake on Oct. 1, 1991, U.S. Pat. No. 5,131,038, issued to Puhl, et al. on Jul. 14, 1992 and U.S. Pat. No. 4,993,068, issued to Piosenka, et al. on Feb. 12, 1991. As noted above, one of the underlying deficiencies of all of these prior art identification systems is that they all rely, in some manner, on information encoded on the credit card being presented. While some of these references include sophisticated encryption algorithms, the fact remains that giving access to the information to the card users lends itself to the potential for reverse engineering and overcoming even the most sophisticated of encryption means.

In the recent past, Citibank introduced a credit card with a digital likeness of the authorized user provided on the card itself. As the Ray patent discloses, the photographic image on the Citibank card resulted in an initial drop in fraud in the New York test market estimated as high as 67 percent. However, as Ray also explains, the Citibank photo card system, like other forms of identity verification that are distributed to the public will eventually be defeated by sophisticated counterfeiting.

An additional difficulty with most prior art verification methods is that they all require the use of a special credit card incorporating some form of identification means. Thus, in order for their use to gain widespread acceptance, replacement of existing credit cards and credit card manufacturing equipment must be accomplished.

The disclosed invention offers a number of advances over prior art identity verification systems and methods, which overcome many of the limitations found in such prior art systems. The first, and perhaps the most significant advantage of the disclosed invention is that the positive identity verification system stores the verification data at a remote site and thereby does not give criminals access to the identity verification medium. This is significant in that any time a potential counterfeiter is afforded the opportunity to access the verification medium, there is the potential that the medium can be corrupted, regardless of the level of security sophistication incorporated into the system. A second, and again significant advantage of the disclosed invention is that the system is completely independent of the credit cards whose users the system is designed to positively identify. Thus, the disclosed invention does not require the modification or replacement of existing credit cards, which would be an almost insurmountable task. Furthermore, the segregation of the identity verification medium from the credit cards themselves allows the system disclosed herein to be used in conjunction with any number of credit cards.

Additionally, low cost disposable cameras and access to drivers' license databases, which are maintained by all of the states, makes wide-scale implementation of the system and method convenient and cost effective. Finally, having an interface to credit authorization agencies resident at the remote database location reduces the hardware needed at the point of verification as well as at the remote database locations, thereby reducing the costs of the overall verification service.

OBJECTS OF THE INVENTION

Accordingly, it is an object of the present invention to provide a system and method of positive identity verification for use in conjunction with transactions where ensuring the identity of persons is important, such as credit card transactions, that separates the identification medium from the credit card user.

Another object of the invention is to provide a positive identity verification system and method which is difficult to counterfeit.

Yet another object of the invention is to provide a system and method for positive identity verification that includes a secure and accurate database of photographic images of individuals and other pertinent data, such as digitized graphical representations of signatures, that can be accessed for multiple positive identification uses.

Still another object of the invention is to provide a system and method of positive identity verification that removes the form of identification from the credit card or the like so that existing credit cards do not need to be replaced in order to implement the device and method.

Yet another object of the invention is to provide a system and method of positive identity verification that removes the requirement for personal signatures from credit cards or the like so that signature forgery is virtually impossible when a credit card is stolen and fraudulently used.

A further object of the invention is to provide a system and method of positive identification that requires accountability on the part of the person verifying that the physical characteristics of the person to be identified match the image of the person that is stored in the system's image database.

A further object still of this invention is to provide a virtually uncounterfeitable system and method for positive identity verification.

These and still other objects of the disclosed invention will become apparent from the following description.

SUMMARY OF THE INVENTION

The present invention is a system and method of positively identifying individuals. The system comprises a point of identity verification terminal having a means for inputting data presented by a particular individual, at least one database storage and retrieval site having stored therein a plurality of digital image data unique to persons to be identified, and a means for exchanging data between the point of verification terminal and the database site. The database site comprises a means for validating that a point of verification terminal seeking to exchange data with the site is authorized to do so. At the database site, the system receives the information presented at the point of verification terminal and searches the database to find the unique image data corresponding to the unique data. The system then transmits the image data to the point of verification terminal where it is displayed on a display means. Finally, the system incorporates a means for verifying that an identifier present at the point of verification has adequately verified that the digital image displayed on the display means matches physical information provided by the person to be identified at the point of verification terminal.

BRIEF DESCRIPTION OF THE DRAWINGS

FIG. 2 is a perspective view of the preferred embodiment of the point of identity terminal, which would be available for use at a point of sale or the like.

DETAILED DESCRIPTION OF THE INVENTION

Figure 1:
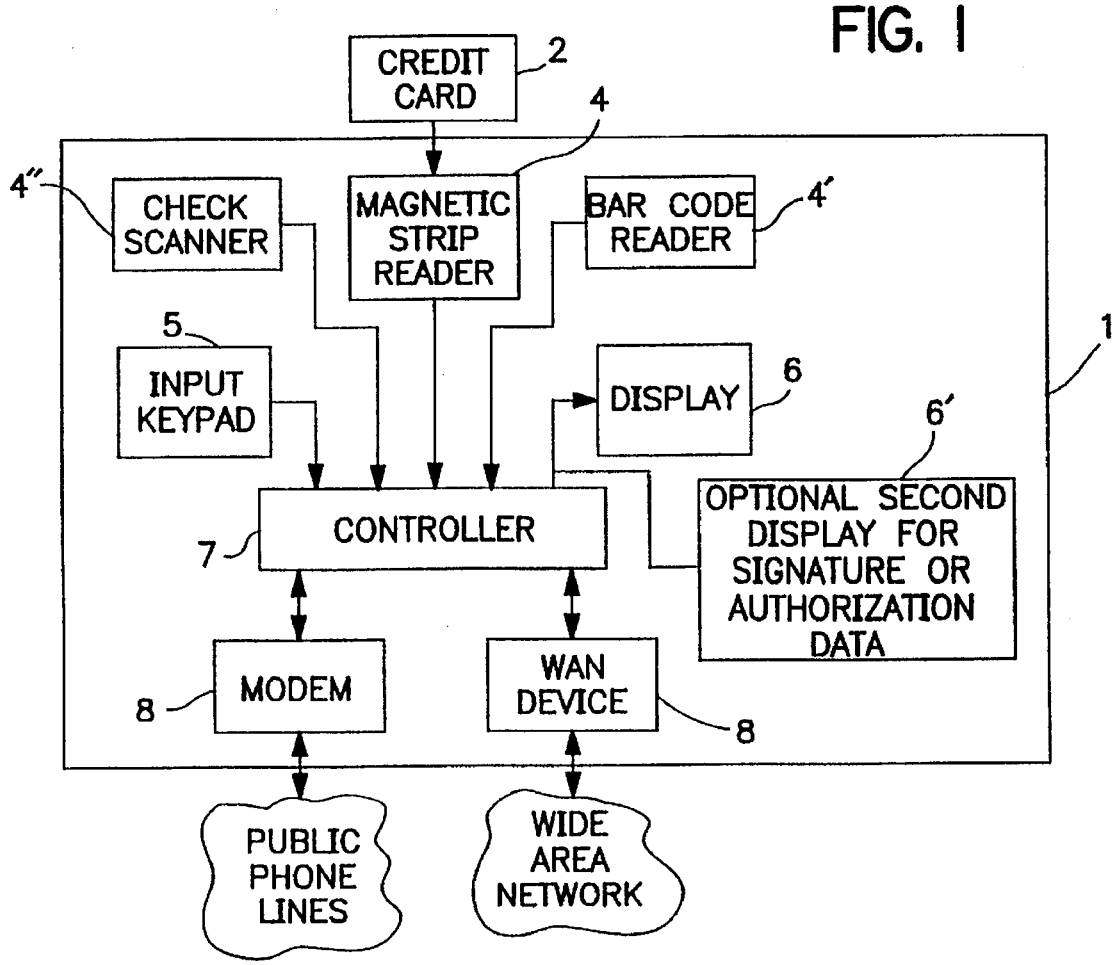
FIG. 1 is a block diagram of the point of identity verification terminal showing the various components contained therein.
Figure 2:
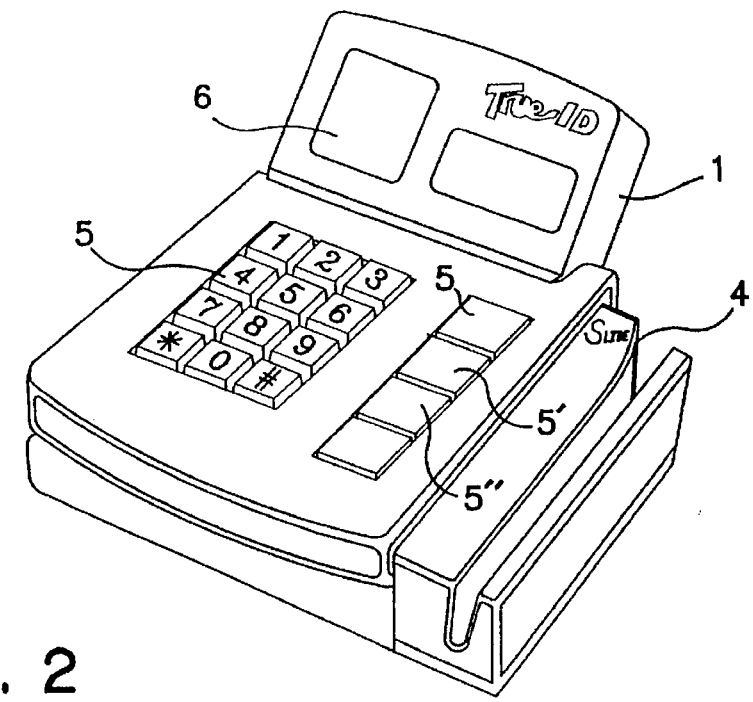
Figure 3:
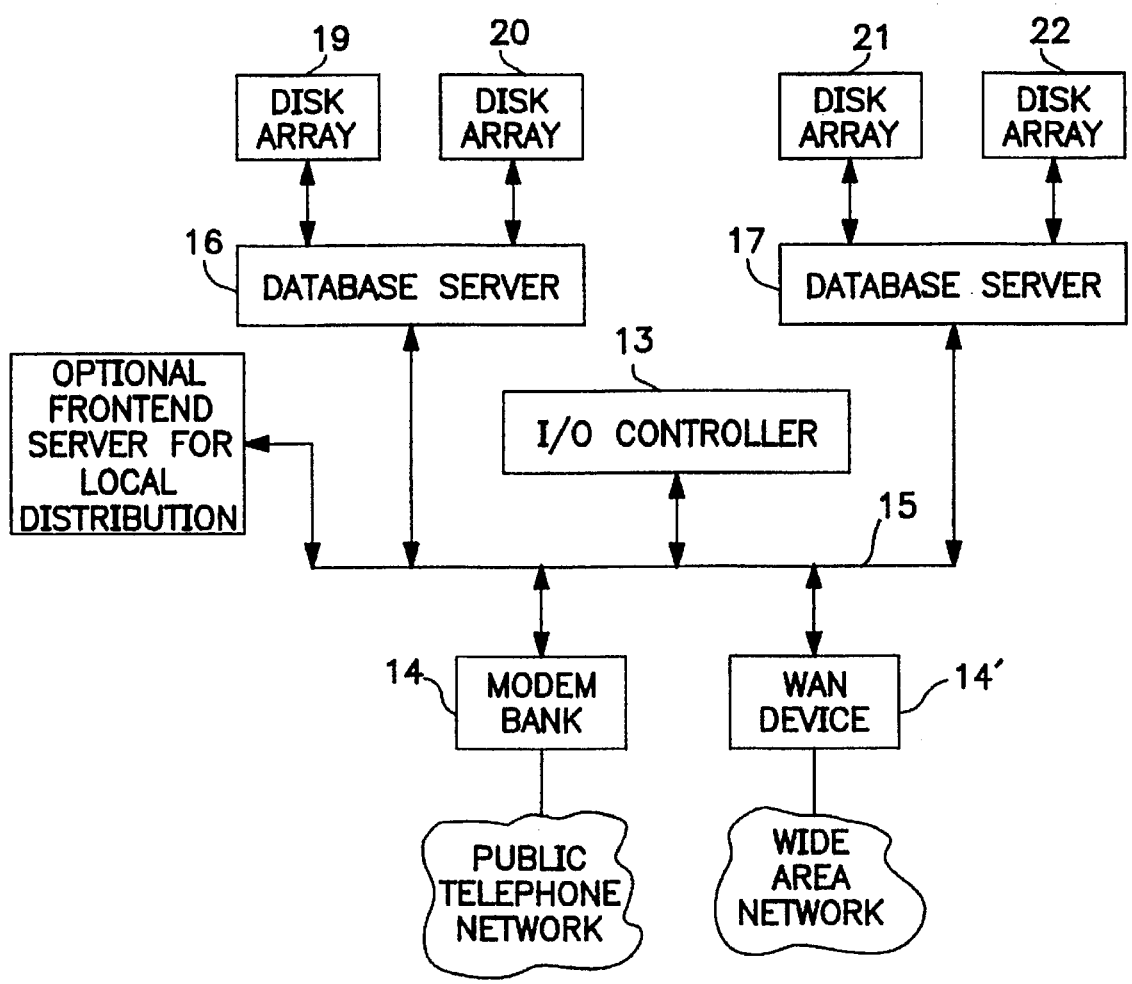
FIG. 3 is a block diagram of components of the positive identity verification system and the communication flowpath established between the point of identity verification and the remote database storage and retrieval center, which is where a comprehensive database of photographic images of persons to be identified is maintained and accessed for transmission to the point of verification.
Figure 4:
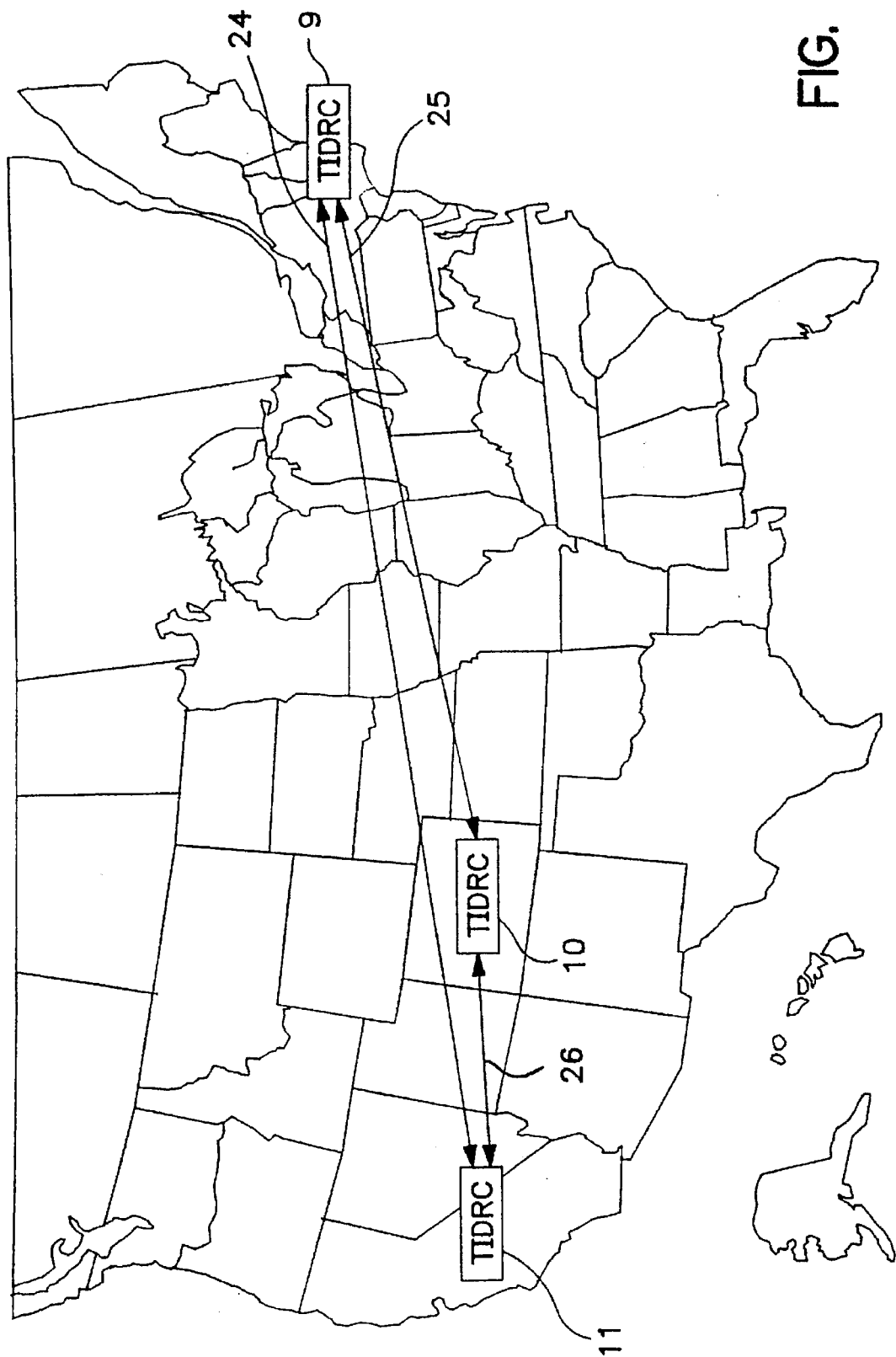
FIG. 4 is an upper level system architecture drawing showing a number of database storage and retrieval centers networked over a global high speed network.

The present invention is a system and method to develop, maintain and use a secure and authentic database of digital photographic image, signature or other data unique to individuals for positive identity verification purposes. The system includes a means for accessing the database in a secure and cost-effective manner, a means for performing positive identity verification, and a distributed database update and retrieval system, which allows for low cost operation, ease of use, stability and robustness for vast numbers of verification requests originating from worldwide locations. The present invention also includes a means that allows for accountability on the part of the user of the system, which in turn will ensure that the system is used to its fullest potential.

The system will be disclosed herein with particular references to a point of sale system, where a credit card is presented by a consumer, or presenter, in order to make a purchase. Thus, the system will make particular references to credit card account numbers, and the like. However, it is understood that the positive identity verification system disclosed herein is adaptable to any application where positive identification of a person is required. Such alternative applications comprise checking and banking transactions, firearm sales, food stamp reimbursement and a host of other applications related to the welfare, voting, law enforcement, health care, airline, immigration and naturalization fields.

Referring now to the figures, a positive identification system in accordance with the disclosed invention is shown. A point of verification terminal 1 is located at a location where the identity of persons present is required to be verified. The point of verification terminal comprises a standard magnetic strip reader 4, an optional bar code reader 4', a check scanner 4", all of which are well known in the art, an input keypad 5, a display means 6, which is preferably a miniature flat panel display, a controller 7, and an internal communication modem or other communications means 8. Although the rate of data exchange may vary depending on the availability of quality phone lines or other means of data transmission, such as a dedicated wide area network or a satellite communications link, the system would transmit data at a rate of at least 9,600 baud per second (bps). However, quality data transmission media will allow for data exchange at rates of 14,400 bps, 28,800 bps or even higher baud rates.

In a credit card transactional situation, the point of verification would be the point of sale, which typically incorporates a cash register and prior art credit card verification systems. Upon presentation of a standard credit card 2, the store clerk or other individual responsible for positive identification would input the credit card account number into the point of identification terminal 1. The preferred method of inputting the credit card information would be by swiping the credit card through the standard magnetic strip reader 4, which would be capable of reading credit card account information, which is currently encoded on magnetic strips on the reverse side of virtually all credit cards. In the alternative, if the magnetic strip containing the account data is corrupted, which routinely occurs due to either wear or contact with a powerful magnetic field, the identifier would simply read the account number off of the credit card, where it is typically provided in embossed characters, and input the credit card account number into the point of identification terminal using keypad 5. Another alternate means of inputting the credit card account information into the point of verification terminal would be to utilize a coded medium such as a bar code. In this embodiment, the magnetic strip reader 4 would be replaced by a standard bar code reader to transfer its data to the code reader 4' and onto controller 7. Another embodiment of the invention would include check scanner 4", which would be used to scan checking account number information off of a standard personal or company check, which would expand the role of the system from credit/debit card transaction identity verification to checking related transactions as well.

In addition to the credit card account information, the identifier could manually input any other information needed to aide in the identity verification process via keypad 5. Such additional information could be whether the presenter is male or female, in which case the keypad could incorporate a specific key to correspond to the male—female choice 5' or whether the presenter is a dependent of the credit card owner, in which case the keypad would incorporate a specific key 5" to correspond to dependent choice.

Once the account number is entered into the point of identification terminal 3, the terminal would initiate communications via its internal communication means, which could be a modem or wide area network (WAN) device to one of a number of remote database storage sites 9–11 using public phone lines 12. Alternative forms of communications links are envisioned as well, and include satellite communications, or dedicated network means. The actual site accessed would be a function of availability and loading on the public access phone lines, network availability, retrieval site availability or other system availability criteria at the time the terminal initiates communications with a remote database site. Communications will then be established with an input/output controller 13 at the remote database storage site through a modem bank 14 at the database storage site, the controller 13 would initiate a query to the point of identification terminal 3 to verify that the terminal has the appropriate authority to access the remote database site and is a valid device. One simple and cost effective method of performing this query is to use commonly available caller ID technology to ensure that the request for data has been originated from an authorized telephone line. Additionally, a software key may be incorporated into each point of identification terminal which will respond in a predetermined manner when queried by a remote database storage site.

Once controller 13 verifies that the requesting point of identification terminal 3 is a valid device and has the appropriate access privilege, the terminal will be allowed to transmit an information request to the database storage site. The information request is also received by input/output controller 14, over a high speed network 15. The high speed network may be fiber distributed data interface (FDDI), asynchronous transfer mode (ATM) or any other suitable cost effective high speed network. The information request is then routed to one of a number of database servers 16–18 where the credit card account data is processed. The selected server then accesses a set of high speed, high reliability disk arrays 19–23 and retrieves the digital photographic or other image or other unique personal data associated with the account data received by the database server.

In addition to retrieving the digital image or other unique personal data stored at the remote database site, the database site would be configured to allow input/output controller 13 to initiate additional information requests from outside information databases. One such scenario envisioned in the credit card processing example would be for the database site to query any one of a number of existing credit authorization agencies (CAA) to verify that the credit card account being processed is valid and within its pre-approved credit limit. An alternate embodiment would be to have the remote database storage and retrieval site(s) co-located at a one or more CAA sites.

The identifier, which would be the sales clerk in a retail establishment, would only need to input the credit card information into one device and would receive both credit approval and identity verification from a single source. In this scenario, input/output controller 13 would initiate a credit authorization request to an outside CAA 23 through modem bank 14 over public access telephone lines 12 or through a WAN connection 14' or the like. If the amount of the transaction is approved by the CAA 23, the database site would receive the credit approval code from the CAA and retransmit the code to the point of verification terminal along with the digital image information or other unique data over its established communications link. The credit approval code would be displayed either on the display means 6 of the point of verification terminal or, in the alternative, on an optional second display means 6'.

The point of identification terminal would then receive the information via modem or WAN connection 8 and route it to controller 7, which would process the information received and display the digital image received on either display means 6. In one embodiment of the invention, the digital information would be stored at the remote database storage site in a compressed state and be transmitted to the point of identification terminal in the compressed state so as to minimize the time associated with a particular transaction. In this embodiment, the controller 7 would first decompress the digital photographic information and then display the information on display means 6.

Another embodiment of the invention, which would be used for situations where the highest security of information would be required, the digital image information would be encrypted in addition to being compressed while it is being transmitted to a point of verification terminal. In this embodiment, the terminal controller 7 would be required to decrypt as well as decompress the photographic information in order to allow the information to be displayed on the display means.

The store clerk, or other person responsible for identity verification would then visually compare the image displayed on the display means with the physical appearance or the signature of the person presenting the credit card at the point of verification. If a match exists, then the clerk would input a specified keystroke sequence on input keypad 5 to indicate that the clerk has in fact verified that an identity match exists. The keystroke sequence would be unique to an individual clerk much like a personal identification number (PIN). The individual PIN would then be transmitted by the point of verification terminal via the communications link to the remote database storage and retrieval site, where the PIN would be associated with the particular transaction being completed and stored for retrieval at a later date should a dispute arise as to whether or not a particular credit card transaction was properly authorized. Thus, the use of a PIN-type system associated with each store clerk would provide accountability and result in a higher level of scrutiny than a system that does not incorporate any features to ensure personal accountability.

Other features that could be added to the basic system include the addition of signature verification capability. Because signatures, as well as photographs, can be digitized and transmitted over a standard communications medium, signature verification would be a natural extension of the basic system. In this embodiment, a digital, graphical representation of a signature would be transmitted to the point of verification terminal from the remote database site at the same time the photographic data is transmitted. In this embodiment, the identifier would be able to display either the photographic image of the presenter or the presenter's digital signature on the display means 6 in order to verify either one or both forms of digital information. In an alternate embodiment, second display means 6' would be used to display an authorized digitized signature at the same time a photographic image of an authorized user is displayed on display means 6. This additional feature would allow participants of the system to maintain signatureless credit cards. Thus, if a criminal were to obtain a credit card, the card would have no signature for the criminal to study and possibly learn to forge. This would add an additional level of security to the system, not found in the basic system.

In an another embodiment of the basic invention, a retrofit terminal is used to add positive identity verification to existing point of sale credit card authorization devices and systems. The retrofit terminal is designed to work in conjunction with existing point of sale devices without the necessity of replacing currently existing retail establishment hardware systems.

The retrofit terminal is added at the existing point of sale and consists of a modified controller, a display means, and a communications interface. Preferably, the display means is a miniature flat panel display, similar to the type used in the point of verification terminal described above. The display can be located on available counter space or, if space is at a premium, it can be mounted on a pedestal or the like. The retrofit terminal would be connected to a standard power source and to the existing credit card authorization hardware via its internal serial or parallel communications interface.

The retrofit terminal would require the use of a modified controller. Instead of accepting the credit card account information from either a magnetic strip reader, a bar code reader, or a manual input, as is the case with the standard point of verification terminal, the retrofit terminal would accept the credit card account information from the existing credit card authorization hardware via its communications interface. The retrofit terminal would then initiate communications to a remote database site in the same manner described earlier in order to retrieve and display identifying data, such as digitized photographs or signatures of the authorized credit card users. However, unlike the standard point of verification terminal, identifier accountability would have to be provided using inputs entered by the identifier on the existing credit card authorization hardware, which would be communicated to the retrofit device via the communications interface. The retrofit terminal would then forward the identifier specific information to the remote database site for storage. The retrofit terminal could also include an optional check scanner or an optional bar code reader to allow for flexibility of use with other forms of payment such as personal or company checks or the like.

Thus, the retrofit terminal would greatly reduce the cost per verification site, would simplify the installation of hardware at each verification site, and would increase the viability and acceptability of the novel positive identity verification system.

Multiple remote database storage and retrieval centers would be tied together via a global high speed network 24–29. Data from any of the database centers can be routed to any of the other centers over the network in order to update the databases, provide redundancy of data, emergency backup, load monitoring and transactional balancing.

Because the disclosed invention can be used without alteration of any substantial kind to the present credit card system, as seen from the perspective of a current credit card user, novel methods will be used to develop the digital photographic image database. One such means of compiling the database would be through the use of disposable cameras, which would be sent to credit card users indicating a desire to participate in the positive identity verification system. The means by which this type of photographic image gathering would lend itself to a high level of security and would thus minimize the amount of fraud that would be associated with the system.

First, an individual wishing to participate in the system would submit a request to the database provider. In the alternative, a credit card provider could include an application request in its monthly billing statement to all its credit card customers. The request to participate would be in the form of an application form, which would request personal information of the participant, including, name, address, and the existing credit card accounts that the participant would want to use in conjunction with the positive identity verification system. The database provider would then assign a unique code to each application and would send a disposable camera to the address listed on the application. The code would preferably take the form of a bar code, which would be more easily machine read by the database provided to allow for a high degree of automation in the development of the database.

Once the participant receives the camera from the database provider, he or she would follow the enclosed directions and have a friend or family member take at least one photograph of the participant with the camera. The camera would preferably have sufficient film to ensure that at least one acceptable photograph of the participant is taken and forwarded to the database provider. However, to minimize the cost associated with the provision of cameras, they would not necessarily include a standard 12 exposure roll of film. Once the photographs are taken, the participant would send the camera via the mail to the database provider. The provider would then develop the film and digitize at least one of the photographic images of the participant. The database provider would then correlate the digital image with the proper participant data using the bar code or other identifying means associated with the particular camera.

In this way, it would be virtually impossible for a counterfeiter to defeat the system. Also, by disassociating the event of providing the applicant information from the event of providing the applicant's photographic image, fraud will be reduced. However, even if a counterfeiter were to intercept a camera, he or she would have to send his or her picture to the database company in order to defeat the system. This would not be an acceptable scenario since the database provider would then have an accurate image of the "would be criminal", which could be provided to the appropriate authorities in the event that fraud is perpetrated.

An alternative form of database development that has been contemplated by the inventor is through the acquisition of digital photographic data of individuals already maintained by other entities. One such alternative source of photographic data is through the Departments of Motor Vehicles (DMV's) of the various states. At present, all states issue driver's licenses to residents, which not only include certain biographical data of drivers, such as name, address, date of birth, social security number, and the like but they also include a photograph of the individual licensee. The DMV's retain for their use all of the biographical data of the licensees, including a duplicate of photographs that appears on the drivers licenses. These photographs, which are retained by the various DMV's can be digitized using a standard technology digital scanner and stored in a format compatible with the positive identity verification system.

Verifying the accuracy of these DMV photographs would require a slightly different procedure that previously described for obtaining digital photographic data using disposable camera technology. In the DMV-based scenario, the database provider would obtain and store the entire photo database from a particular state in a separate, state specific source database. The database provider or any credit card company could sent participation requests to those individuals resident in a state whose DMV database has been included in the provider's master database. Upon receipt of a participation request, the database provider would forward a digital photograph of the requesting individual for verification that the requesting party with a return form or the like to indication that the photograph is an accurate representation of the appearance of the requesting party. Once the database provider has received confirmation of the accuracy of the photograph, it would transfer the specific photo from the state specific source database to the general database. The same scenario would work with digital representations of signatures as well.

Various changes coming within the spirit of the invention may suggest themselves to those skilled in the art; hence the invention is not limited to the specific embodiment shown or described, but the same is intended to be merely exemplary. It should be understood that numerous other modifications and embodiments can be devised by those skilled in the art that will fall within the spirit and scope of the principles of the invention.

What is claimed is:

1. A positive identity verification system comprising:

a point of verification terminal having a means for accepting information presented by a person to be positively identified at a point of verification and a means for displaying a digital photographic images of persons;

at least one remote database site having stored therein a database comprising a plurality of digital photographic images of persons to be identified;

a means of communicating between said point of identification terminal and said remote database to interchange information data between the two;

a means for verifying that said point of verification terminal is authorized to access said remote database site; and a means for verifying that an identifier present at the point of verification terminal has compared the digital photographic images displayed on the display means with the physical appearance of said person being identified at the point of verification terminal and that a match exists between at least one of said digital photographic images and the physical appearance of said person being identified.

2. The positive identity verification system as claimed in claim 1, wherein the means for verifying that the identifier present at the point of verification terminal has compared and verified that the identifying information unit matches the physical information presented by the person to be identified is a personal identification number unique to said identifier, which is input into the point of verification terminal using an input means.

3. The positive identity verification system as claimed in claim 2, wherein said input means is multi-function keypad.

4. The positive identity verification system as claimed in claim 1, wherein said verification means is a standard caller identification means.

5. The positive identity verification system as claimed in claim 1, wherein said verification means is a software key, communicated by said point of verification terminal to said database site to unlock the database site for access.

6. The positive identity verification system as claimed in claim 1, wherein said means of communication comprises a point of verification modem communicating with a modem located at one of said database sites over a data flow path.

7. The positive identity verification system as claimed in claim 6, wherein said data flow path comprises public access telephone lines.

8. The positive identity verification system as claimed in claim 6, wherein said data flow path is a dedicated wide area network.

9. The positive identity verification system as claimed in claim 6, wherein said data flow path is a satellite communications link.

10. A positive identity verification system for use in verifying that a presenter of a credit card is the owner of said credit card, comprising:

a point of verification terminal comprising a means for accepting account information presented by said presenter, said information associated with a credit card account;

a remote database storage and retrieval site for storing, retrieving, processing and transmitting digital photographic images, said digital photographic images being stored at said remote database site, each of said digital photographic images stored at said remote database site being associated with at least one credit card account and corresponding to at least one authorized user of said credit card;

a means for communicating between the point of verification terminal and the remote database site;

a means for verifying that said point of verification terminal is authorized to access said information stored as said remote database site;

a means for transmitting said account information to said remote database site;

a means for retrieving said one or more of said digital photographic images associated with said credit card account;

a means for displaying at least one digital photographic image at said point of verification terminal; and a means for inputting information at the point of verification terminal to indicate that an identifier at the point of verification terminal has visually verified that at least one of said digital photographic images displayed on the display means matches the physical appearance of the presenter of the credit card for use.

11. The positive identity verification system as claimed in claim 10, wherein said means for accepting said credit card account information is a magnetic strip reader for reading a standard magnetic strip associated with a credit card, said strip containing said credit card account information.

12. The positive identity verification system as claimed in claim 10, wherein said means for accepting said credit card account information is a bar code reader for reading a bar code associated with a credit card, said bar code containing said credit card account information.

13. The positive identity verification system as claimed in claim 10, wherein said means for accepting said credit card account information is a multi-function keypad.

14. A positive identity verification system to ensure that a presenter of a credit card is authorized to use said credit card comprising:

a credit card reader means for use by a sales clerk for accepting credit card account information, said credit card reader being located at a point of sale and identity verification;

a remote database means for storing digital photographic images of individuals, each of said digital photographic images being associated with specified credit card account information;

a means for communicating between said credit card reader and said remote database means to transmit said credit card account information from said card reader to said database means and for transmitting the digital photographic images associated at said database storage means with said transmitted account information to said card reader;

a means for verifying that said credit card reader is authorized to access said remote database site;

a means for displaying said received digital photographic images at the point of verification for visual observation by said sales clerk for comparison with the physical appearance of said presenter at the point of identity verification; and a user means for accepting an input from said sales clerk to indicate that at least one of the digital photographic images displayed on said display has been compared to and matches the physical appearance of the presenter of said credit card.

15. A positive identity verification system comprising:

a database storage and retrieval site remote from a point of identity verification, said database site storing digital photographic images corresponding to a plurality of persons to be positively identified, each of said digital photographic images corresponding to a person to be identified and further corresponding to at least one information unit presented by said person to be identified;

a means for establishing communications between said database site and said point of verification, said communication means capable of accepting and transmitting said presented information unit to said database site;

a search means for searching said database to find each of said digital photographic images corresponding to said presented information unit received by said database;

a means for transmitting each of said digital photographic images to the point of verification;

a means at said point of verification for displaying each of said digital photographic images transmitted to the point of verification from said database site;

a means for verifying that an identifier present at the point of verification terminal has compared the digital photographic images displayed on the display means with the physical appearance of the person being identified at the point of verification terminal and that a match exists between the two; and a means for verifying that said means at said point of verification for displaying each of said digital photographic images is authorized to access said remote database site.

16. A method of positive identity verification comprising the steps of:

inputting a first information unit presented by a presenter to be positively identified into a point of verification terminal;

establishing communications between said point of verification terminal and a remote database site said database site having stored therein a database comprising a plurality of digital photographic images, at least one of said digital photographic images corresponding to said first information unit input at said point of verification terminal;

verifying that the point of verification terminal is authorized to access said remote database site;

transmitting said first information unit from said terminal to said remote database site over a communications means;

retrieving at least one of said digital photographic images corresponding to said first information unit transmitted to said database site;

transmitting at least one of said digital photographic images over the communications means to said point of verification terminal;

displaying at least one of said digital photographic images received from said database site on a display means located at said point of identity verification;

comparing said displayed digital photographic image with the physical appearance of the presenter at the point of verification;

inputting identifier specific data into said point of verification terminal to indicate that the identifier has compared the displayed digital photographic images with the physical appearance of the presenter and that the physical appearance of the presenter match at least one of the displayed digital photographic images; and transmitting and storing said identifier specific data at said remote database site for recall should a positive identification transaction be questioned at a later date.

17. The method of positive identity verification claimed in claim 16, wherein said first information unit is a credit card account number.

* * * * *